US009977718B1

(12) United States Patent
Kulkarni et al.

(10) Patent No.: US 9,977,718 B1
(45) Date of Patent: *May 22, 2018

(54) SYSTEM AND METHOD FOR SMART THROTTLING MECHANISMS FOR VIRTUAL BACKUP APPLIANCES

(71) Applicant: EMC IP Holding Company LLC, Hopkinton, MA (US)

(72) Inventors: Gururaj Kulkarni, Karnataka (IN); Bala Vijayakumar, Acton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/455,096

(22) Filed: Mar. 9, 2017

Related U.S. Application Data

(63) Continuation of application No. 14/578,310, filed on Dec. 19, 2014, now Pat. No. 9,628,561.

(51) Int. Cl.
G06F 15/16 (2006.01)
G06F 11/14 (2006.01)
G06F 9/455 (2018.01)

(52) U.S. Cl.
CPC ...... *G06F 11/1464* (2013.01); *G06F 9/45558* (2013.01); *G06F 2009/45583* (2013.01); *G06F 2009/45595* (2013.01); *G06F 2201/815* (2013.01)

(58) Field of Classification Search
CPC ............. H04L 67/1095; G06F 11/1451; G06F 11/1453

USPC ........................................................ 709/217
See application file for complete search history.

(56) References Cited

U.S. PATENT DOCUMENTS

| 8,060,476 B1* | 11/2011 | Afonso | G06F 11/1451 707/649 |
| 8,135,930 B1* | 3/2012 | Mattox | G06F 9/45558 711/100 |
| 8,429,630 B2* | 4/2013 | Nickolov | G06F 9/4856 717/110 |
| 8,782,008 B1* | 7/2014 | Xing | G06F 17/30575 707/660 |
| 9,047,128 B1* | 6/2015 | Sreegiriraju | G06F 9/5083 |
| 2008/0049786 A1* | 2/2008 | Ram | G06F 9/5083 370/468 |

(Continued)

*Primary Examiner* — Vivek Srivastava
*Assistant Examiner* — Atta Khan
(74) *Attorney, Agent, or Firm* — Womble Bond Dickinson (US) LLP

(57) ABSTRACT

A method for managing resources of virtual backup appliances is described. The method includes receiving, by a backup management server (BMS), a request to back up a plurality of virtual machines (VMs), determining, at the BMS, a set of VMs to be backed up from the plurality of VMs that yields a maximum performance for the backup request without causing the set of VM servers to become bottlenecked, wherein the determination is performed based on at least one of a concurrency limit of the virtual backup appliance (VBA) and any VBA proxies corresponding to the set of VMs, and a set of one or more data performance metrics of one or more storage devices in the set of VM storage arrays, and sending one or more backup jobs to the VBA to back up the determined set of VMs to be backed up to a backup storage system.

17 Claims, 8 Drawing Sheets

(56) References Cited

U.S. PATENT DOCUMENTS

| | | | | |
|---|---|---|---|---|
| 2009/0106571 A1* | 4/2009 | Low | ................ | G06F 9/4856 |
| | | | | 713/310 |
| 2009/0313447 A1* | 12/2009 | Nguyen | ............ | G06F 11/1451 |
| | | | | 711/162 |
| 2010/0262794 A1* | 10/2010 | De Beer | ............ | G06F 9/45533 |
| | | | | 711/162 |
| 2011/0047340 A1* | 2/2011 | Olson | ................ | G06F 11/1456 |
| | | | | 711/162 |
| 2014/0237070 A1* | 8/2014 | Choi | ................ | H04L 67/1097 |
| | | | | 709/216 |
| 2015/0142942 A1* | 5/2015 | Voruganti | ........... | H04L 67/1097 |
| | | | | 709/223 |
| 2016/0057077 A1* | 2/2016 | Gomatam | ............ | H04L 47/788 |
| | | | | 709/226 |

* cited by examiner

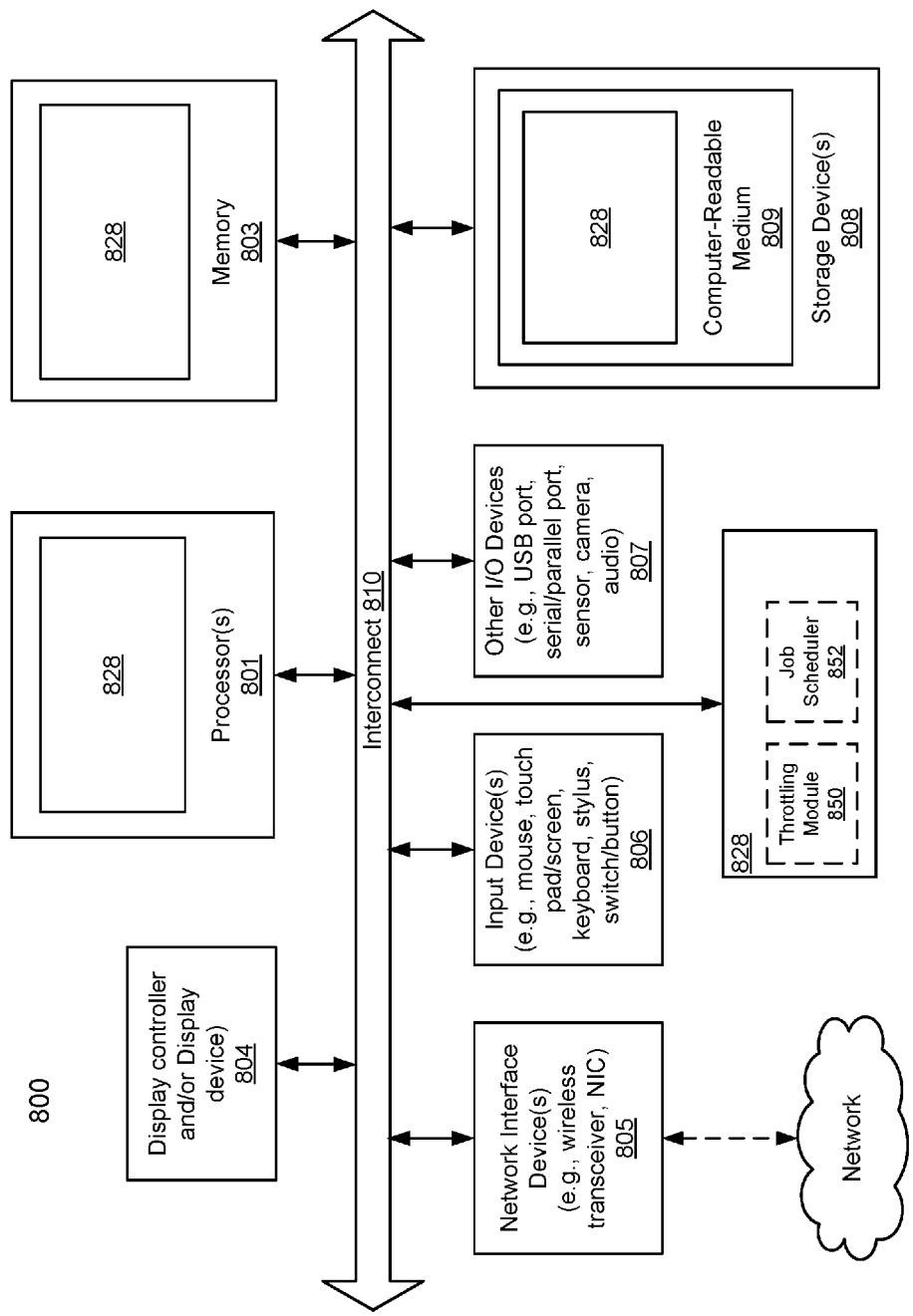

SYSTEM AND METHOD FOR SMART THROTTLING MECHANISMS FOR VIRTUAL BACKUP APPLIANCES

This application is a continuation of U.S. patent application Ser. No. 14/578,310, filed Dec. 19, 2014, which is incorporated by reference herein in its entirety.

FIELD OF THE INVENTION

Field of the Invention

Embodiments of the present invention relate generally to data storage systems. More particularly, embodiments of the invention relate to smart throttling mechanisms for virtual backup appliances.

Background

Virtual machines (VMs) provide one mechanism for an enterprise to reign in the costs of expansion by reducing hardware expenditures. However, the introduction of VMs into an enterprise presents new challenges in the data management of the new VM environment. New systems have been created to address issues such as backup management of the VM environment. Typically, these systems include a backup management server, a backup storage system, and one or more virtual backup appliances (VBAs), which are VMs in the VM environment that include logic for backing up the other VMs in the environment. An example of such a system is EMC® Avamar/NetWorker (Hopkinton, Mass.).

In a typical backup scenario, the backup management server may send a request to one or more of the VBAs to request backup of one or more VMs to the backup storage system. The one or more VBAs receive the request and then fetch the VM disk files for the VMs in the system and transmit the disk files (possibly after deduplication) to the backup storage system. However, while this works well for smaller backup jobs, for larger jobs with many VMs, this backup methodology runs into problems. A particular issue is with performance and maintaining service level standards.

When a large backup request is submitted to the system, the system may attempt to execute the individual jobs (e.g., a backup job for an individual VM) of the request all at once. This creates a risk of having the system run out of memory or suffer reduced performance. One possible solution to this issue is to better size the underlying environment. For example, an administrator may size the environment to have a large memory capacity. However, this may not always be feasible as the requirements of the real life system may differ greatly from the estimated requirements.

Thus, there is a desire for a better system to manage the resources of the VM environment and backup system during the execution of a backup request.

BRIEF DESCRIPTION OF THE DRAWINGS

Embodiments of the invention are illustrated by way of example and not limitation in the figures of the accompanying drawings in which like references indicate similar elements.

FIG. 8 is a block diagram illustrating an example of a data processing system which may be used with one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
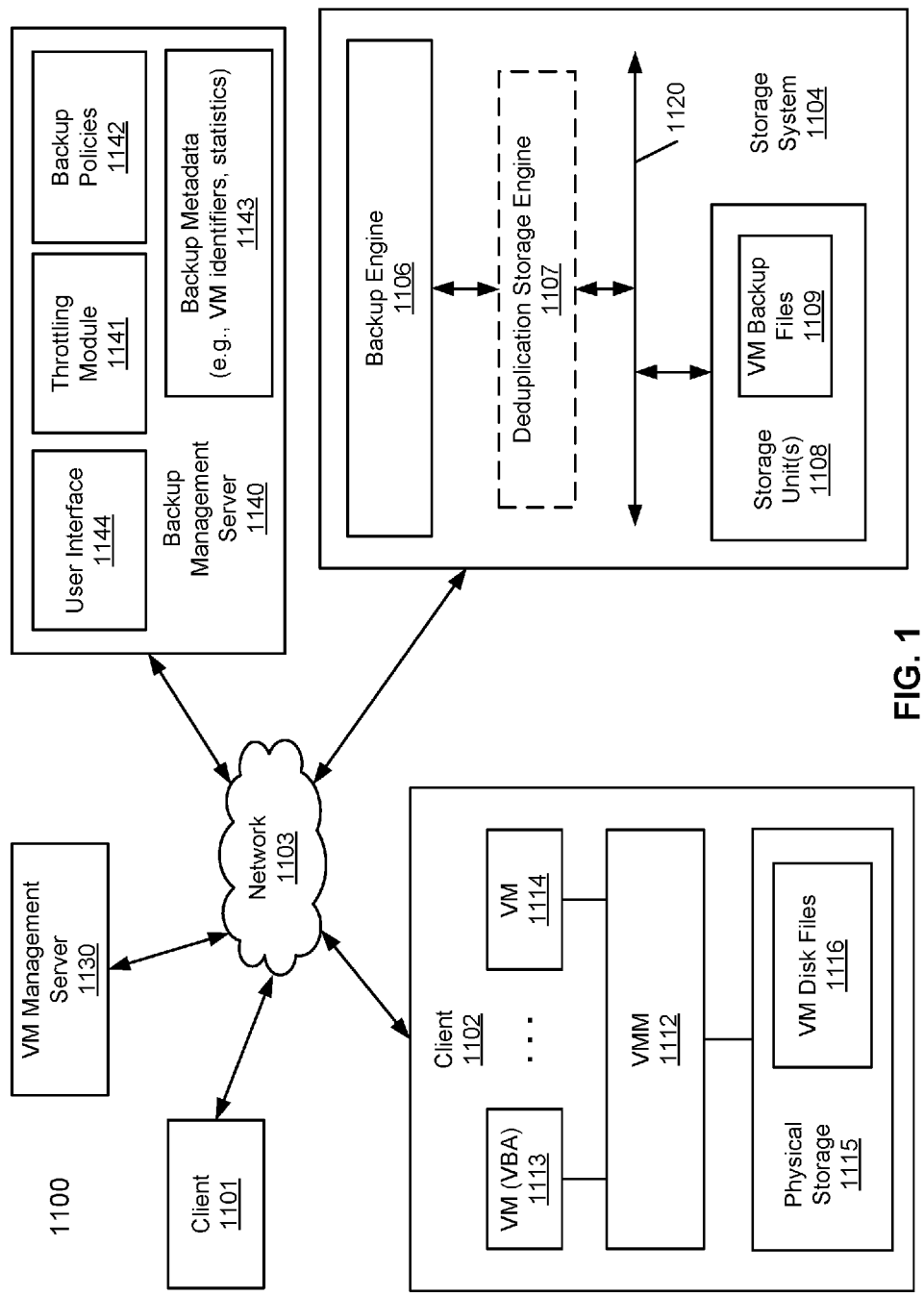
FIG. 1 is a block diagram illustrating a storage system according to one embodiment of the invention.

FIG. 1 is a block diagram illustrating a storage system according to one embodiment of the invention. Referring to FIG. 1, system 1100 includes, but is not limited to, one or more client systems 1101-1102 communicatively coupled to storage system 1104 over network 1103. Clients 1101-1102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 1103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 1104 may include any type of server or cluster of servers. For example, storage system 1104 may be a storage server used for any of various different purposes, such as to provide multiple users with access to shared data and/or to back up mission critical data. Storage system 1104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1104 may have a distributed architecture, or all of its components may be integrated into a single unit. Storage system 1104 may be implemented as part of an archive and/or backup system such as a de-duplication storage system available from EMC® Corporation of Hopkinton, Mass.

In one embodiment, storage system 1104 includes, but is not limited to, backup engine 1106, deduplication storage engine 1107, and one or more storage units 1108-1109 communicatively coupled to each other. Storage units 1108-1109 may be implemented locally (e.g., single node operating environment) or remotely (e.g., multi-node operating environment) via interconnect 1120, which may be a bus and/or a network. In one embodiment, one of the storage units 1108-1109 operates as an active storage to receive and store external or fresh user data, while the other storage unit operates as a target storage unit to periodically archive data from the active storage unit according to an archiving policy or scheme. Storage units 1108-1109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1108-1109 may also be combinations of such devices. In the case of disk storage media, the storage units 1108-1109 may be organized into one or more volumes of Redundant Array of Inexpensive Disks (RAID).

In response to a data file to be stored in storage units 1108-1109, optional deduplication storage engine 1107 is configured to segment the data file into multiple segments according to a variety of segmentation policies or rules. Deduplication storage engine 1107 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 1108-1109 or across at least some of storage units 1108-1109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 1108-1109, such that files can be accessed independent of another storage unit. Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 1106 is configured to backup data from client systems 1101-1102 and to store the backed up data in one or more of storage units 1108, which may be deduplicated by deduplication storage engine 1107. In one embodiment, backup engine 1106 can back up data from a client system that is stored in a virtual operating environment such as a VM provided by a variety of VM vendors such as VMware®. The data can be backed up without having to install a backup agent within the corresponding VM and/or without having to mount the corresponding VM disk on a proxy server. Further, instead of backing up the entire VM disk, a portion or subdirectory of the VM disk can be backed up.

In this example, client 1102 includes one or more VMs 1113-1114 hosted by VM monitor or manager (VMM) 1112, where VMs 1113-1114 include virtual backup application or software executed therein to perform backup operations of data in a local storage system and/or a remote backup storage such as storage system 1104. The VMs having the respective backup application software executed therein (or communicatively coupled to, or associated with) are referred to as virtual backup appliance (VBAs). Data of each of VMs 1113-1114 is stored in one of VM disk files 1116 in physical storage 1115 (e.g., local storage) representing a virtual storage device of the associated VM. Data stored in VM disk files may be optionally deduplicated by a deduplication storage engine (not shown). VMs 1113-1114 may be managed by a remote VM management server 1130 (e.g., vCenter from VMware), which communicates with VMM 1112 over network 1103, for example, via an application programming interface or API, which may be operated by a third party entity that is different than an entity of backup server 1140.

A virtual machine represents a completely isolated operating environment with a dedicated set of resources associated with. A virtual machine may be installed or launched as a guest operating system (OS) hosted by a host OS. Typically, a host OS represents a virtual machine monitor (VMM) (also referred to as a hypervisor) for managing the hosted virtual machines. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources.

According to one embodiment, backup engine 1106 is to parse a virtual disk file of a VM (e.g., virtual disk files 1116 of VMs 1113-1114) to generate metadata describing content files of stored in a virtual storage device of the VM. In one embodiment, backup engine 1106 of storage system 1104 accesses the VM disk file of a data processing system such as client system 1102 hosting one or more VMs, where each VM corresponds to a virtual disk file storing content files of a virtual storage device of the respective VM. In one embodiment, backup engine 1106 remotely accesses over network 1103 virtual disk file 1116 via an API of VMM 1112 (e.g., virtual storage API) to parse virtual disk file 1116 to generate metadata representing the content files contained in the virtual disk file. In one embodiment, backup engine 1106 communicates with the VMM 1112 to cause the VMM 1112 to generate a snapshot of the virtual disk file 1116 and to generate the metadata based on the snapshot of the virtual disk file.

In one embodiment, the metadata is utilized to generate a file index database (e.g., metadata database, not shown) that can be queried subsequently for backup purposes. The file index database can be implemented in a variety of formats or architectures. In one embodiment, the file index database includes many entries, each entry corresponding to a file stored in a particular directory of the corresponding virtual disk file 1116, also referred to herein as a source virtual disk file, and storing metadata associated with the respective file. Metadata of a file may include information that can identify the file from the source virtual disk file, such as a file system record identifier (ID) identifying a file system record of the file compatible with a file system of the source virtual disk file, current and/or parent directory information of the file, and at least some file attributes of the file (e.g., at least some information from an mode of the file). The file index database may further include information describing the corresponding virtual disk file, such as virtual disk file header information or information associated with the corresponding VM, such that the source virtual disk file can be recreated based on information stored in the file index database.

The file index database can be utilized to back up data from a source virtual disk file, by either a full backup or a partial backup, at a variety of granularity levels (e.g., block and/or file granularity level). In one embodiment, in response to a request to back up a subdirectory (also referred to as a subtree) of one or more files of a VM, backup engine 1106 accesses the file index database based on an identifier (e.g., directory name) of the requested subdirectory obtained from the request to identify a file system record or records associated with the requested subdirectory. Backup engine 1106 transmits the file system record identifying information to VMM 1112 to retrieve the data blocks corresponding to the file system records. Data blocks corresponding to the identified file system records are then backed up from the source virtual disk file of the remote data processing system without having to back up the remaining data of the source virtual disk file. The data blocks may further be deduplicated by deduplication storage engine 1107 before being stored in storage units 1108. Note that some functionality of backup engine 1106 as described above may be implemented within backup management server 1140 (or simply referred to as a backup server). Similarly, certain functionalities of backup server 1140 may be integrated with storage server 1104.

According to one embodiment, backup server 1140 includes, maintained therein, user interface 1144, throttling module 1141, and backup policies 1142. User interface 1144 may be implemented as a graphical user interface (GUI) such as a Web interface or a command-line interface (CLI) to allow a user such as an administrator to initiate and manage backup operations that back up data from clients 1101-1102 to backup storage system 1104, based on one or more backup policies 1142. Backup server 1140 further maintains backup metadata 1143 storing backup operations and/or statistics of the backup operations. Backup metadata 1143 may further include information identifying VMs 1113-1114 whose backup operations are managed by backup server 1140.

According to one embodiment, throttling module 1141 is configured to allow the backup management server (BMS) 1140 to throttle the number of backup jobs or backup processes running against the storage system 1104 and against the VM client 1102 so that the backup process is able to run more efficiently. In some embodiments, the VBA on the VM client server reports to the BMS 1140 the number of concurrent jobs it may handle. In some embodiments, before any scheduled backup jobs, the VBA measures the performance of the storage units 1108 that store the VM backups and relays this information to the BMS 1140. The VBA may also determine or calculate how many backup streams it can handle concurrently and its buffering capacity (e.g., queue length) without significant delay, and communicate such information to backup management server 1140, for example, in real-time, periodically, or in demand from backup management server 1140. The BMS 1140 then customizes the backup policy 1142 such that the backup jobs are run against the storage units 1108 to have the best aggregate data throughput. In some embodiments, the BMS 1140 causes the VBA to measure data latency in real time during a backup and report this information to the BMS 1140. When the BMS 1140 determines that latency has increased beyond a threshold value, the BMS 1140 may stop adding to the backup queue at one or more of the VBAs. In some embodiments, additional logic or software on the VBAs assist in the implementation of the throttling.

This improvement provides a great benefit over traditional systems. In traditional systems, when a large number of backup jobs are scheduled at the BMS 1140, the BMS 1140 sends all these jobs to the respective VBAs. This influx of a large number of backup jobs may cause resource errors such as out of memory errors, or may cause performance issues as multiple jobs attempt to access the same resources simultaneously, or may cause the jobs to simply time out and never be completed. In this traditional approach, the BMS and the VBAs do not necessarily have any intelligence of the underlying environment. Instead, with this improvement, the system can provide a particular service level and more guaranteed performance and reliability, regardless of the resources allocated to the underlying system. This improved system will be further described with reference to FIGS. 2-8. In some embodiments, this improved system is included as part of the NetWorker® backup system of EMC Corporation (Hopkinton, Mass.).

Figure 2:
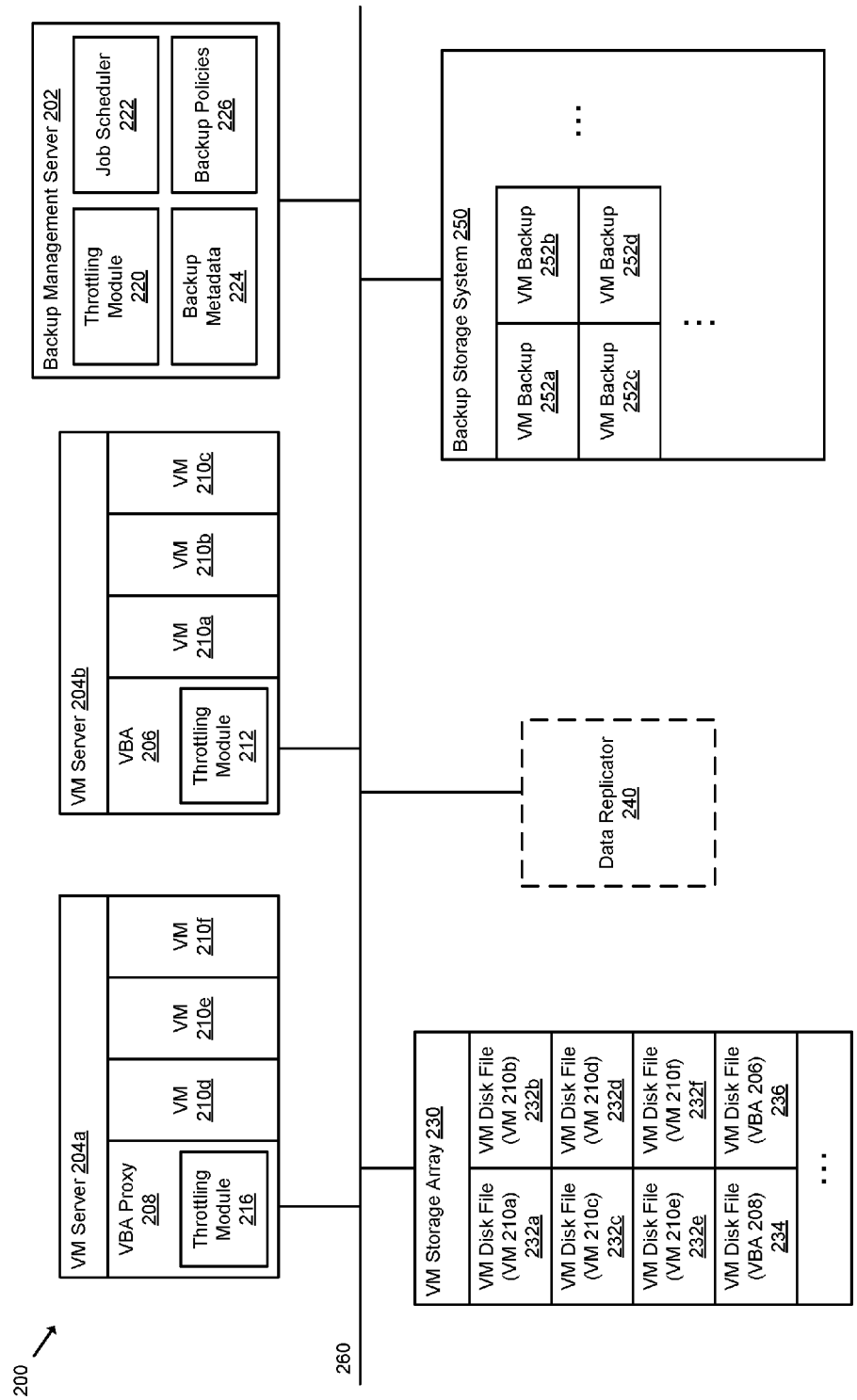
FIG. 2 is a block diagram illustrating a system for smart throttling mechanisms for virtual backup appliances according to an embodiment of the invention.

FIG. 2 is a block diagram illustrating a system 200 for smart throttling mechanisms for virtual backup appliances according to an embodiment of the invention. System 200 includes a backup management server (BMS) 202. In some embodiments, the BMS 202 is the same as the BMS 1140 of FIG. 1. The BMS 202 is connected to the other elements of the system 200 via network connection 260 (e.g. Fibre Channel, IP). BMS 202 includes a job or task scheduler 222 to schedule jobs with the VBAs on the VM servers 204. The job scheduler 222 receives backup requests that are associated with the backup policies 226, which are set by an administrator, and execute the backup jobs of the request against the VMs. For example, a backup policy in backup policies 226 may indicate that a certain set of VMs should be backed up. As another example, a policy may indicate various rules to be applied to the backup of a set of VMs specified in the backup request. As another example, the policy may indicate to back up a set of VMs that have a particular timestamp.

In some embodiments, BMS 202 also includes backup metadata 224. Backup metadata 224 includes metadata information regarding the backup jobs and the VMs (e.g., backup statistics, VM identifiers, etc.). In some embodiments, backup metadata 224 is the same as backup metadata 1143 as described in FIG. 1.

In some embodiments, BMS 202 includes a throttling module 220. This module may be comprised of software and/or hardware. The module includes logic to determine the capabilities and status of the VBAs, the VM servers, and the VM storage in the system, and is able to use this system to send backup jobs to the VBAs but without causing a bottleneck to occur in the VBAs or the VM storage. The details of throttling module 220 will be described in further detail below.

System 200 also includes one or more VM servers 204 (e.g., VM 204*a-b*). VM servers are hardware hosts that provide a platform for VMs, such as VMs 210*a-f*, to execute on top of. In some embodiments, the VM servers 204 are known as hypervisors. In some embodiments, the VM servers 204 are the same as the client 1102 in FIG. 1. Although two VM servers 204 are depicted in FIG. 2, in some embodiments the system includes more than two VM servers and in some embodiments the system only includes one VM server.

Each one of the VM servers 204 includes a VBA. The VBA may be a VM on a VM server with special software that may interface with the VM server software or hypervisor directly and access the VM disk files for the VMs on the respective VM server. This allows the VBA to perform various file and backup operations on the VM disk files of the server and communicate with the BMS 202 to receive backup jobs from BMS 202. One of the VM servers 204 includes a primary VBA 206, and the remaining VM servers 204 include a VBA proxy 208. The VBA proxy 208 is similar in function to the VBA 206 in function but does not include management functions. Thus, while the VBA proxy 208 may include a job queue, it may not include a scheduler. Instead, the VBA proxy 208 is managed and/or controlled by the primary VBA 206. When the BMS 202 receives a backup request, the BMS 202 sends the backup jobs to the primary VBA 206, which then coordinates amongst the VBA proxies (e.g., 208). The VBA proxies may not communicate with the BMS 202 directly. The VBA and the VBA proxies then back up the VM disk files from the VM storage array and send these files to the backup storage system 250. Although only one VBA proxy 208 is shown in FIG. 2, in some embodiments of the invention the system has multiple VM proxies per primary VBA, and may also have multiple primary VBAs. In some embodiments, the VBAs also perform deduplication of data before sending the data to the backup storage system. In some embodiments, the VBA interfaces with the VM server hypervisor or VM monitor through the use of a plugin to the VM server hypervisor or VM monitor software.

Each VBA, whether a proxy or primary, includes a throttling module (e.g., throttling module 216 and 212). This module is configured to allow the VBA to throttle backup jobs such that no bottlenecks, performance, or reliability issues occur. The details of the throttling module on the VBAs will be described in further detail below.

System 200 also includes a VM storage array 230. This array includes one or more storage devices that store the VM disk files (e.g., VM disk files 232*a-f*) for the VMs on the VM servers 204. As noted previously, VM disk files 232 are files that represent the storage media for the VMs on the VM server. When the VM accesses a storage device inside the VM, the VM server 204 accesses the corresponding VM disk file on the storage array 230. In some embodiments, system 200 includes data replicator 240. This may be a hardware server that duplicates or replicates backup data from the VBAs in order to copy the data to various storage media, such as backup storage system 250, or to a separate tape drive, etc.

System 200 also includes a backup storage system 250. The backup storage system 250 includes one or more storage devices that store the backups made from the VMs 210 by the VBAs 206 and 208. The backup storage system 250 may receive the backup files from the VM storage array 230 via the VBAs, or may receive the backup files from the data replicator 240. When BMS 202 receives a backup request (e.g., from a client device), the throttling module 220 on BMS 202 may perform one or more throttling actions in order to ensure a particular service level, performance, and reliability.

In some embodiments, the throttling module 220 on BMS 202 has queried the VBA 206 for the number of concurrent backup jobs that the primary VBA 206 and its proxies (e.g., VBA proxy 208) can process. If the BMS 202 sends a number of backup jobs exceeding this limit to the VBA, then the jobs will sit in a job queue on the VBA, and after a timeout period passes, those jobs that are still in the job queue may be discarded. However, since the BMS 202 has queried the VBA regarding its concurrent backup job limit, the BMS 202 sends only those number of backup jobs to the primary VBA 206, and the primary VBA 206 then passes the jobs to any VBA proxies. The remaining jobs are stored or queued at the job scheduler 222 and are sent to the VBAs after the VBAs have processed some of the current batch of jobs. Further details regarding this embodiment will be described with reference to FIG. 3.

In some embodiments, the throttling module 220 queries the throttling module 212 on the primary VBA 206 to request a performance metric regarding the VM storage array 230. The primary VBA 206 then takes sample reads of the various VM disk files 232 stored on various storage devices of the VM storage array 230, and sends this information to the BMS 202. The throttling module 220 on BMS 202 may then calculate a combination of storage devices from VM storage array 230 for which reading from them would generate the greatest net aggregate throughput. Based on this information, the BMS 202 sends those backup jobs in the backup request that include VM disk files 232 on those storage devices, such that a backup of these VM disk files 232 would yield the greatest net aggregate throughput. Further details regarding this embodiment will be described with reference to FIG. 4.

In some embodiments, the BMS 202, after receiving the backup request, sends a portion of the backup jobs of the backup request to the VBAs. At regular intervals, the BMS 202 queries the VBAs for the I/O latency of the current accesses to the VM storage array 230. When the threshold is reached, the BMS 202 restricts the number of additional jobs that are sent to the VBAs. Further details regarding this embodiment will be described with reference to FIG. 5.

These improvements described above allows an administrator to back up a large amount of data without having to worry about any failures of the backup system. Furthermore, scheduling the backups based on component level capability will give a smart way of addressing data protection challenges in a large data center. Additionally, the BMS is made to be smart thinking in ensuring a fairly even distribution of the load on individual components in backup workflow. This improvement prevents non-functional issues such as backup hanging, backups waiting forever, performance issues due to un-managed queue depth on the VBA, etc.

Furthermore, as the VM environment grows it becomes more complex to address the functional as well as non-functional issues due to backup failures, hang issues, and performance issues. This improvement would help to reduce the turnaround time in addressing such issues. Additionally, resource utilization on the VBA can be more fairly used by distributing the backup load fairly on the VBA. This would help to enhance the end user experience by ensuring more successful backup rates even during unusual scenarios such as single policy backing up more than 1000 VMs with just one VBA.

Figure 3:
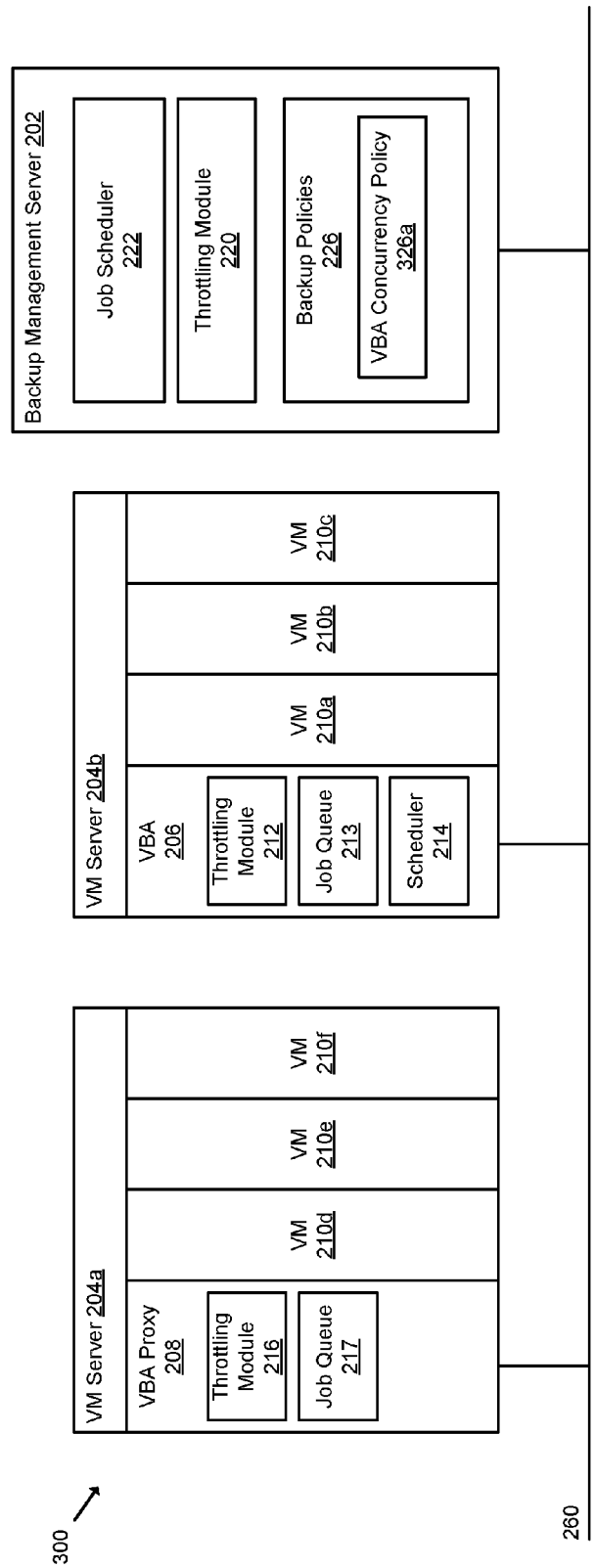
FIG. 3 is a block diagram of a system illustrating one method for smart throttling mechanisms for virtual backup appliances according to an embodiment of the invention.

FIG. 3 is a block diagram of a system 300 illustrating one method for smart throttling mechanisms for virtual backup appliances according to an embodiment of the invention. The system 300 in FIG. 3 presents a simplified version of the system 200 in FIG. 2 in order not to obscure the portions of the invention that will be described below. In some embodiments, the primary VBA 206 additionally includes a scheduler 214 to schedule backup jobs. In some embodiments, scheduler 214 on the primary VBA 206 also schedules the backup jobs for the VBA proxy 208. For example, when multiple backup jobs arrive at the primary VBA 206, the primary VBA 206 may determine which jobs to send to the proxy based on which VMs are on which VM server, or based on the priority of the job, or based on the resources to be used by each backup job, etc. In some embodiments the VBA proxy also includes a scheduler.

Each VBA may also include a job queue (e.g., job queue 217 and 214). This job queue holds the backup jobs that are sent to the VBA but which cannot be processed at the moment. The job may not be able to be processed because all concurrent backup job slots on the VBA are taken by other backup jobs. In some scenarios in a VM environment, if a single VBA (e.g., VBA 206) is backing up a large number of VMs (e.g., 1000+) in a virtual data center with a majority of these VMs stored on a small number of storage units in the VM storage array, then the job queue at the VBA may become very large and the VBA becomes a bottleneck. For example, in some cases, each VBA can process up to 8 backup jobs concurrently. In this case, if many hundred backup jobs were sent to that VBA for processing, the job queue on that VBA would be unnecessarily long, and if an error were to occur in the system, or if a timeout counter was implemented for the backup jobs in the queue, some backup jobs might be lost.

To solve this problem, in some embodiments, when a backup request is received at the BMS 202, the BMS 202 has queried the VBAs in the system (e.g., VBAs 208 and VBA 206) their limits on concurrent backup jobs. In some embodiments, this query is performed by throttling module 220. This limit may be preset for the VBA by an administrator or developer of the VBA software, or may be determined automatically by the VBA based on available system resources. The VBA then responds to the BMS 220 with its concurrent backup job limit including, for example, a number of proxies the VBA is associated with. This response may be made via the throttling module of the VBA (e.g., throttling module 216 and 213).

The BMS 202 may then store this concurrent job limit information within the backup policies 226 as a separate policy (e.g., VBA concurrency policy 326a) or in combination with an existing backup policy. Alternatively, the BMS 202 may store this concurrent job limit information in a separate policy, and an administrator may apply the policies on BMS 202 (through a GUI) to one or more VMs or groupings of VMs (e.g., groupings at the VM server level, system level, cluster level, etc.).

Subsequently, an administrator may initiate or schedule the backup policy in backup policies 226 that includes the concurrency limit information. Once the policy is executed, the backup request made at the BMS 202 and the BMS 202 submits the individual backup jobs of the backup request to the primary VBA 206 such that the number of backup jobs sent do not exceed the concurrency limit calculated for the primary VBA and its VBA proxies. For example, if the concurrency limit of each VBA is 8, then if there are two VBAs total including the primary VBA, then the maximum number of concurrent jobs would be 16.

In some embodiments, the concurrency limit is not stored within the backup policies 226, and instead the BMS 202 queries the VBAs for the concurrency limit after the backup request is made. In such a case, if the VBA concurrency policy 326a is applied to a set of VMs for a particular backup request, this indicates to the BMS 202 to query the concurrency limit of the VBAs before submitting the jobs for this backup request to the VBAs.

During the backup operation, when one of the VBAs completes a backup job, it will notify the BMS 202, at which point the BMS 202 submits another job to that VBA to replace the completed job. This method of throttling helps to ensure that all backup jobs are processed without having to wait for long time in queue and also ensures that the jobs are not terminated due to any timeout mechanism. This also helps to maintain an efficient means of handling queuing by single primary VBA with or without VBA proxies.

Figure 4:
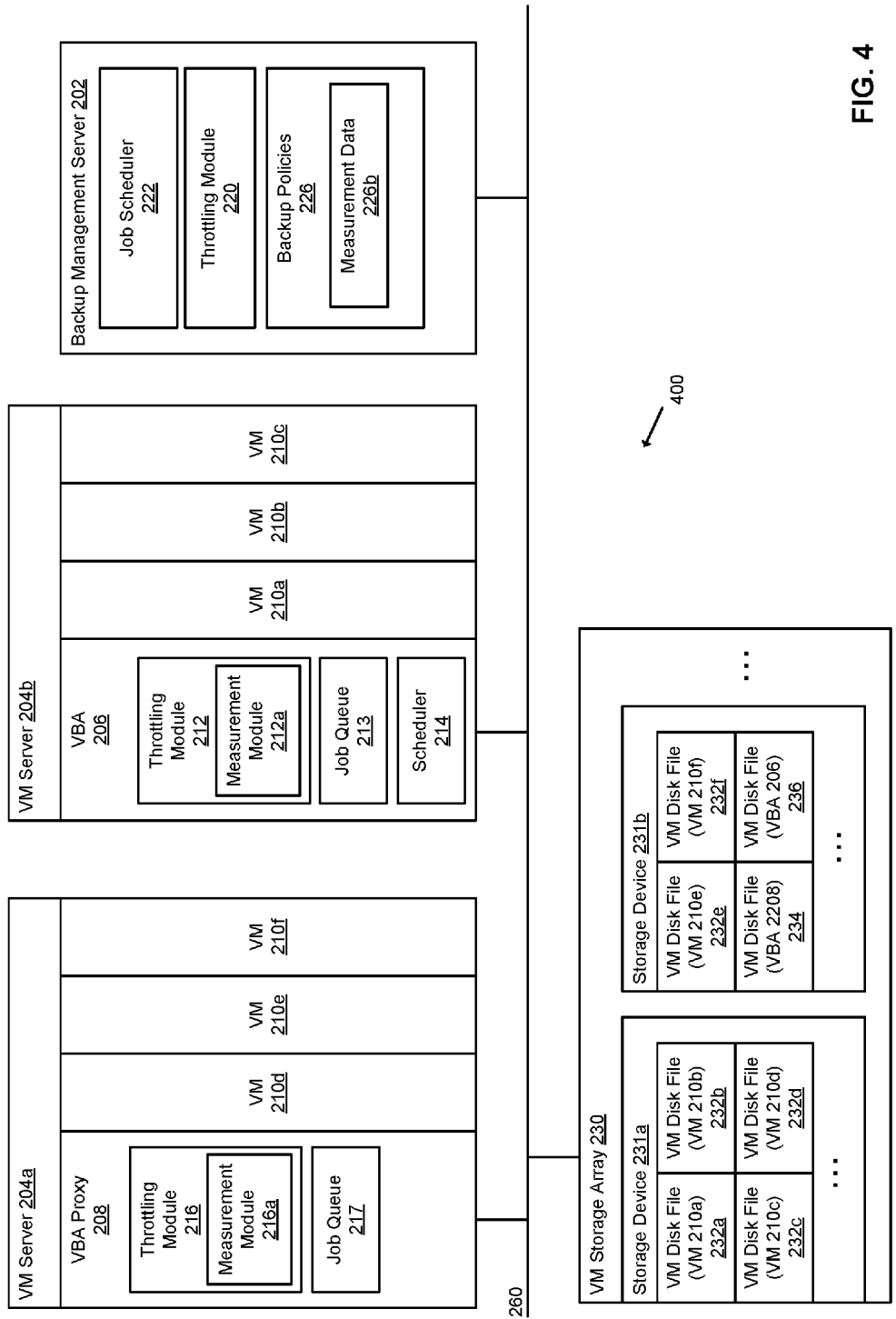
FIG. 4 is a block diagram of a system illustrating a second method for smart throttling mechanisms for virtual backup appliances according to an embodiment of the invention.

FIG. 4 is a block diagram of a system 400 illustrating a second method for smart throttling mechanisms for virtual backup appliances according to an embodiment of the invention. The system 400 in FIG. 4 presents a simplified version of some of the elements in system 200 of FIG. 2 in order not to obscure the portions of the invention that will be described below.

In some embodiments, one or more of the VBAs include a measurement module 216a as part of the throttling module 216. This measurement module 216a is able to measure the read and write performance throughput and/or I/O latency performance of the various storage devices 231 of the VM storage array 230. In some embodiments, the VM storage array 230 includes more than one storage device 231 to store the VM disk files 232. The performance on each of these storage devices 231 may vary, and the distribution of the VM disk files 210 on the storage devices 231 may also vary both to the number and size of the files on each storage device and also in regards to which VM 210 has which one of its VM disk files 232 on which storage device.

Thus, in some cases, if a single VBA with multiple VBA proxies are backing up a huge number of VMs (e.g., 1000+)

with a majority of these VMs residing on a single storage device (or sharing a limited bandwidth connection), this creates a high concurrency of data streams per storage device and thus the storage device or VM storage array itself could be stressed and become a bottleneck. Once this bottleneck is reached, the performance of the backup is reduced.

To solve this problem, in some embodiments, the throttling module 220 on the BMS 202 submits a request to the throttling module on one or more of the VBAs to measure the data throughput performance of each storage device 231 by performing a few sample reads and/or writes of the VM disk files 210 on the corresponding storage device 231. The VBA may measure the data throughput (either read or write or both) or latency of the storage device 231, and return that data to the BMS 202. The VBA may also measure the highest concurrent number of reads or writes that the storage device 231 may accept without losing performance (i.e., maximum read/write performance). For example, the VBA may read from the VM disk files on a single storage device and issue increasing number of concurrent read requests until a plateau or limit is reached.

Once the BMS 202 receives the storage device measurement data from the VBAs, the BMS 202 may store this data as measurement data 226b in backup policies 226. BMS 202 may then be able to present this data to an administrator so that the administrator may configure a backup policy that submits an optimal combination of backup jobs for VMs with VM disk files that when backed up maximize the net aggregate throughput (i.e., that have a net aggregate maximum read performance throughput) of the storage devices on the VM storage array 230 when the VBAs are processing a set of backup jobs. Alternatively, the BMS 202 may automatically schedule the backup jobs for each VBA such that a maximum net aggregate data throughput is reached.

For example, in the exemplary system of FIG. 4, four VM disk files are on storage device 231a, and four VM disk files are on storage device 231b. If, for example, each storage device 231 is saturated by three concurrent read operations, then the BMS 202, after it receives this performance metric from the VBAs, can schedule jobs such that the VMs that are backed up only require three concurrent read requests to each storage device 231. This means that some backup jobs for some VMs that are stored on the same storage device may be postponed until the prior VM backup job is completed.

Figure 5:
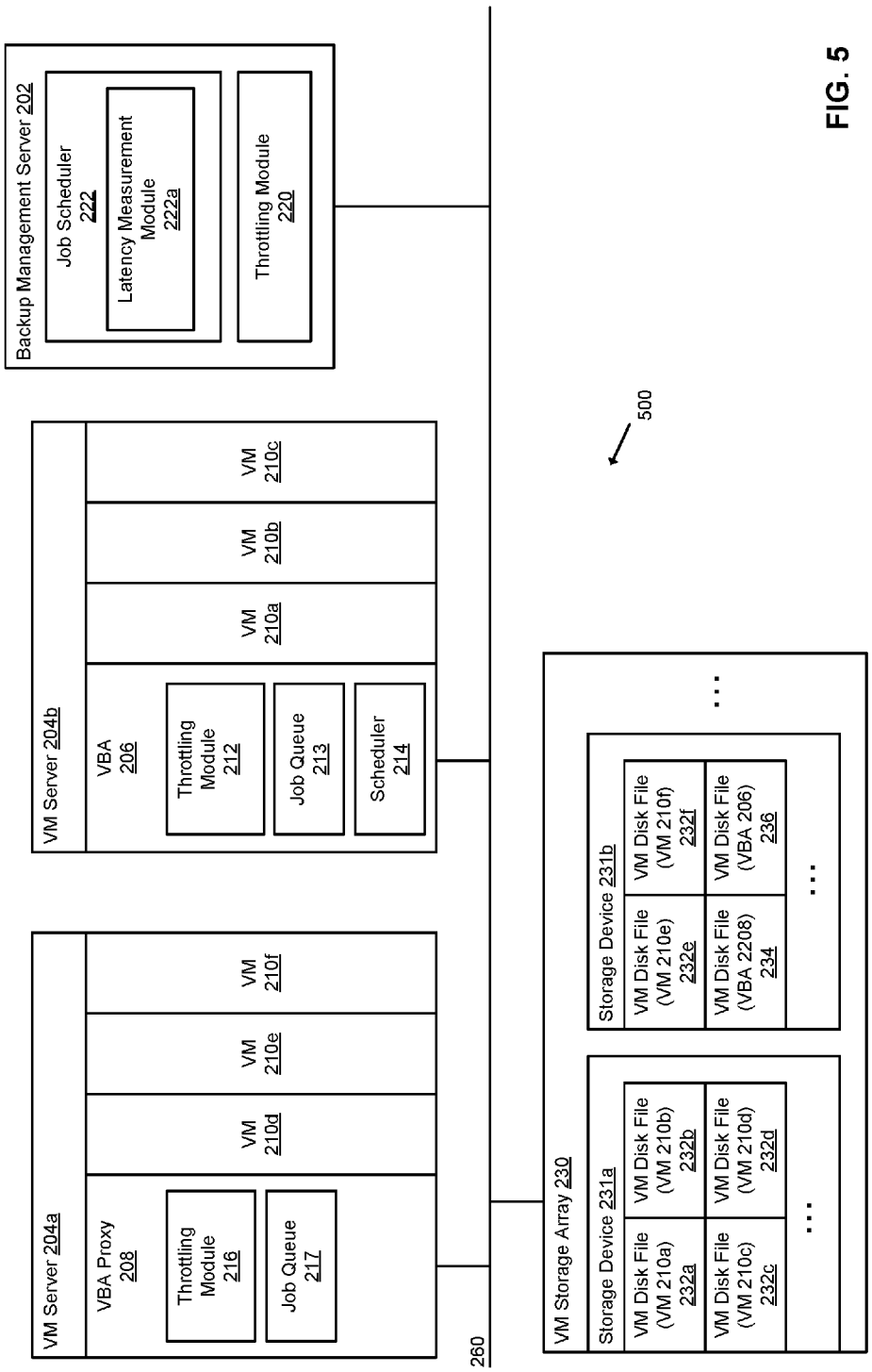
FIG. 5 is a block diagram of a system illustrating a third method for smart throttling mechanisms for virtual backup appliances according to an embodiment of the invention.

FIG. 5 is a block diagram of a system 500 illustrating a third method for smart throttling mechanisms for virtual backup appliances according to an embodiment of the invention. The system 500 in FIG. 5 presents a simplified version of the system 200 in FIG. 2 in order not to obscure the portions of the invention that will be described below.

In some embodiments, the BMS 202 includes a latency measurement module 222a which may be included within the job scheduler 222, or may be a separate module. When the BMS 202 receives a backup request (either manually from an administrator or automatically through a schedule), the BMS 202 begins to send the backup jobs to the VBAs but also periodically measures the latency of the access to the storage devices 231 as reported by the VBAs (possibly via the throttling module on the VBA), or by comparing an estimated completion time for a job under no congestion versus the actual completion time.

In some embodiments, in order to make these measurements, the BMS 202 has stored within it, possibly in the backup policies 226 or backup metadata 224, information regarding what storage devices 231 the VM disk files of each VM 210 is stored on. The BMS 202 continues to send an increasing number of backup jobs to the VBAs. Once the BMS 202 determines that the latency response or job completion time related to a particular storage device 231 is slowed beyond a predetermined threshold (due to the increasing number of access on that storage device from the backup jobs), then BMS 202 may determine that this particular storage device is bottlenecked or saturated. The BMS 202 may then configure the VM server, possibly through the throttling module of VBA on the server, to limit the amount of I/O requests that each backup job for VMs stored on that storage device can make. In some embodiments, the BMS 202 limits all I/O requests to the same storage device equally (or similarly) such that all concurrent requests are provided with the same share of the throughput. In some alternative embodiments, the BMS updates the existing backup jobs on the VBA to indicate a certain I/O request rate. In some embodiments, the predetermined threshold is set by an administrator.

In majority of virtualized data centers, the underlying storage will be shared. The shared storage generally hosts many VMs. The performance of a backup job backing up such VMs thus depends on underlying data store throughput. If data store where the VMs resides is saturated beyond its data transfer capacity, then there is a penalty to the backup or recovery performance. The improvements presented with reference to FIG. 4 and FIG. 5 allows the BMS 202 to intelligently throttle the backup jobs based on the performance characteristics of each storage device in the VM storage array.

Figure 6:
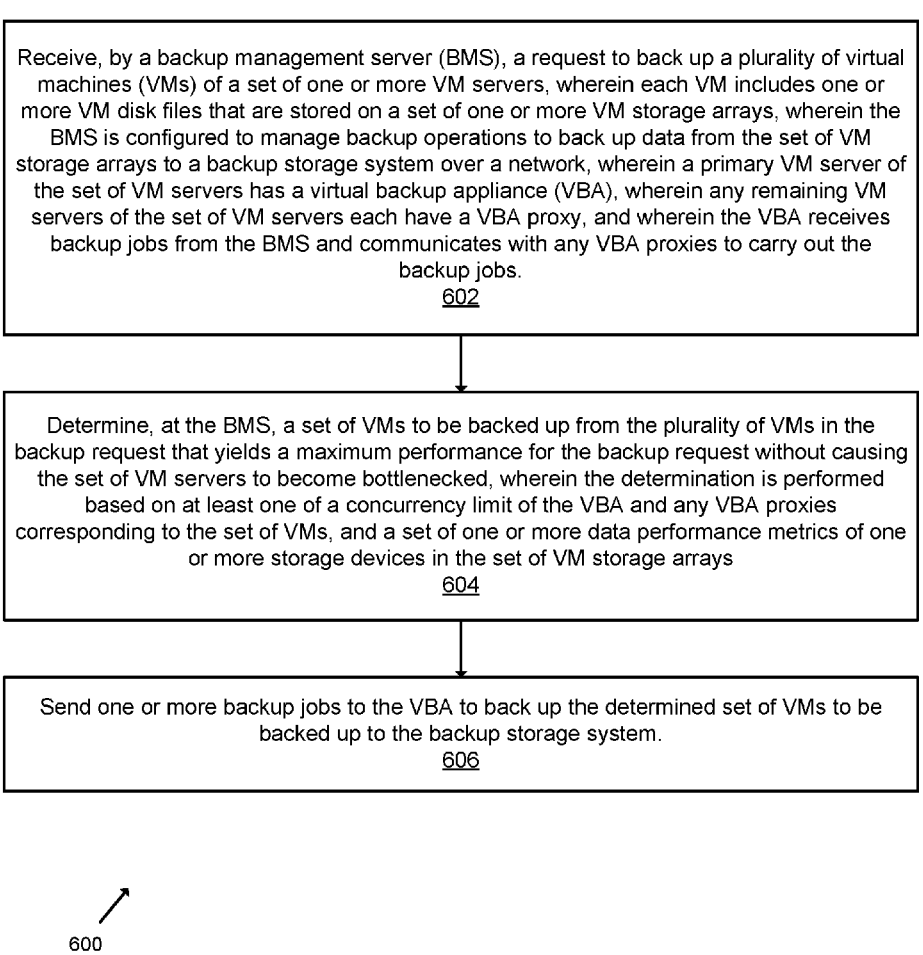
FIG. 6 is a flow diagram illustrating a method for smart throttling mechanisms for virtual backup appliances according to an embodiment of the invention.

FIG. 6 is a flow diagram illustrating a method 600 for smart throttling mechanisms for virtual backup appliances according to an embodiment of the invention. In some embodiments, method 600 is performed by a BMS (e.g., BMS 202). The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagram.

At block 602, the method includes receiving, by a backup management server (BMS), a request to back up a plurality of virtual machines (VMs) of a set of one or more VM servers, wherein each VM includes one or more VM disk files that are stored on a set of one or more VM storage arrays, wherein the BMS is configured to manage backup operations to back up data from the set of VM storage arrays to a backup storage system over a network, wherein a primary VM server of the set of VM servers has a virtual backup appliance (VBA), wherein any remaining VM servers of the set of VM servers each have a VBA proxy, and wherein the VBA receives backup jobs from the BMS and communicates with any VBA proxies to carry out the backup jobs.

At block 604, the method includes determining, at the BMS, a set of VMs to be backed up from the plurality of VMs in the backup request that yields a maximum performance for the backup request without causing the set of VM servers to become bottlenecked, wherein the determination is performed based on at least one of a concurrency limit of the VBA and any VBA proxies corresponding to the set of VMs, and a set of one or more data performance metrics of one or more storage devices in the set of VM storage arrays.

At block 606, the method includes sending one or more backup jobs to the VBA to back up the determined set of VMs to be backed up to the backup storage system.

In some embodiments, the concurrency limit of the VBA and any VBA proxies is the maximum number of VMs that each VBA and VBA proxy can process at once, and wherein the BMS further requests concurrency limits from the VBA and any VBA proxies prior to the sending of the one or more backup jobs, and wherein the set of VMs to back up is of a number equal to the net concurrency limit of the VBA and any VBA proxies.

In some embodiments, the set of data throughput performance metrics includes a set of one or more maximum read performance throughput limits of each of the one or more storage devices in the set of VM storage arrays, and wherein the set of VMs to be backed up is determined from the plurality of VMs in the backup request such that a net aggregate maximum read performance throughput is reached for the set of VM storage arrays when the VBA and any VBA proxies carry out the back up of the set of VMs to be backed up.

In some embodiments, the net aggregate maximum read performance throughput is reached when the set of VMs to be backed up is selected to have VM disk files that when backed up by the VBA and any VBA proxies, generate the maximum read throughput limit in the most number of the one or more storage devices in the set of VM storage arrays.

In some embodiments, the set of data throughput performance metrics includes a set of one or more latency measurements for the one or more storage devices in the set of VM storage arrays as measured by the BMS while the VBA and any VBA proxies carry out the one or more backup jobs, wherein, for each of the one or more storage devices, the BMS sends an increasing number of the one or more backup jobs to the VBA for VMs that have VM disk files on that storage device until the latency measurement for that storage device exceeds a predetermined threshold, and wherein the set of VMs to be backed up are those VMs that are associated with the one or more backup jobs.

In some embodiments, the BMS adjusts an input/output (I/O) rate of all the backup jobs for VMs with VM disk files on a saturated storage device such that each job requests a similar amount of data transfer from that saturated storage device, wherein a saturated storage device is a storage device with a latency measurement that exceeds the predetermined threshold.

In some embodiments, the BMS includes a backup policy store to store at least one of the concurrency limit of the VBA and any VBA proxies corresponding to the set of VMs, and the set of one or more data performance metrics.

Figure 7:
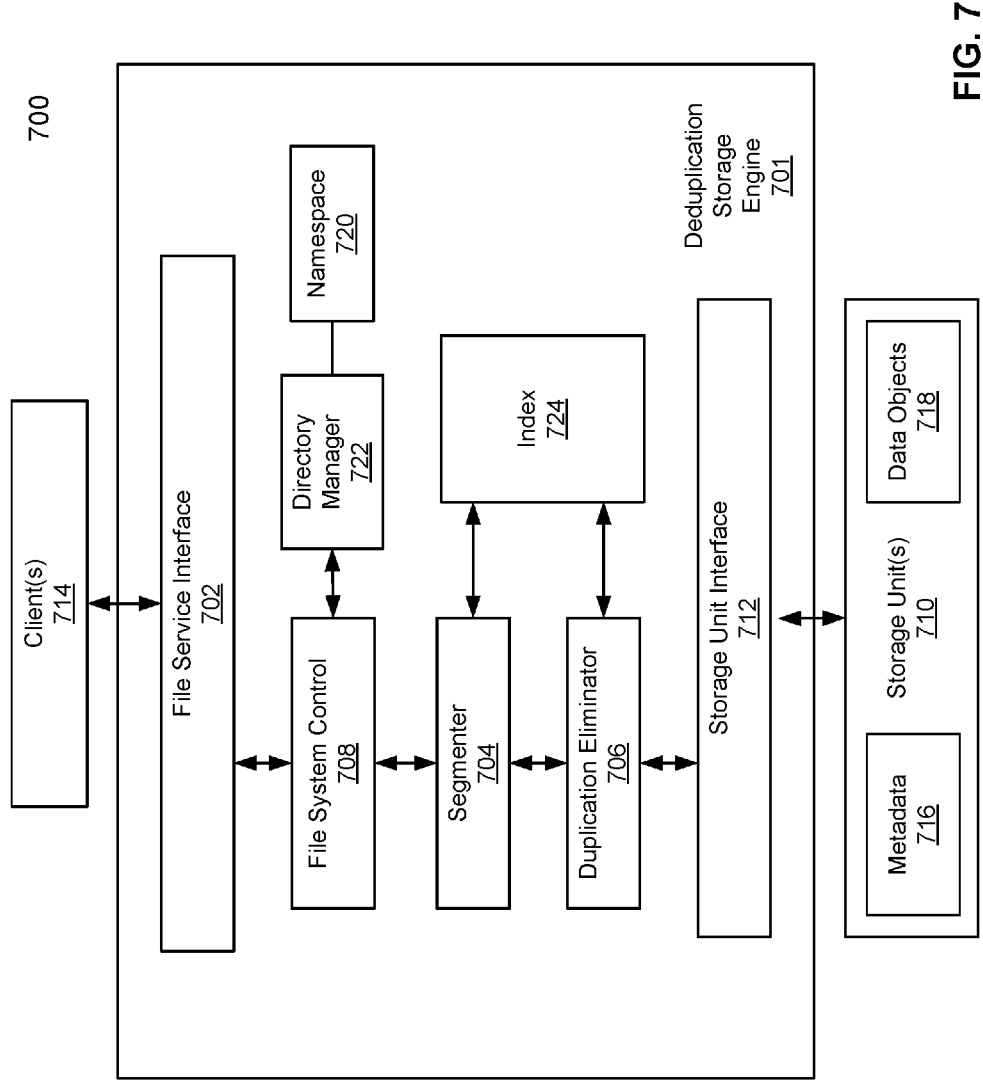
FIG. 7 is a block diagram illustrating a deduplication storage system according to one embodiment of the invention.

FIG. 7 is a block diagram illustrating a deduplication storage system according to one embodiment of the invention. For example, deduplication storage system 700 may be implemented as part of a deduplication storage system as described above, such as, for example, the deduplication storage system as a client and/or a server as shown in FIG. 1. The deduplication components of system 700, such as the deduplication storage engine 701, may also be implemented as part of the VBA and VBA proxies of FIGS. 2-5. In one embodiment, storage system 700 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 700 may have a distributed architecture, or all of its components may be integrated into a single unit. Storage system 700 may be implemented as part of an archive and/or backup system such as a deduplicating storage system available from EMC® Corporation of Hopkinton, Mass.

In one embodiment, storage system 700 includes a deduplication engine 701 interfacing one or more clients 714 with one or more storage units 710 storing metadata 716 and data objects 718. Clients 714 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 710 may be implemented locally (e.g., single node operating environment) or remotely (e.g., multi-node operating environment) via an interconnect, which may be a bus and/or a network (e.g., a storage network). In one embodiment, one of storage units 710 operates as an active storage to receive and store external or fresh user data from a client (e.g., an end-user client or a primary storage system associated with one or more end-user clients), while the another one of storage units 710 operates as a target storage unit to periodically archive data from the active storage unit according to an archiving policy or scheme. Storage units 710 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 710 may also be combinations of such devices. In the case of disk storage media, the storage units 710 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 716, may be stored in at least some of storage units 710, such that files can be accessed independent of another storage unit. Metadata of each storage unit includes enough information to provide access to the files it contains. In one embodiment, metadata may include fingerprints contained within data objects 718, where a data object may represent a data chunk, a compression region (CR) of one or more data chunks, or a container of one or more CRs. Fingerprints are mapped to a particular data object via metadata 716, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 716 may include a file name, a storage unit identifier (ID) identifying a storage unit in which the chunks associated with the file name are stored, reconstruction information for the file using the chunks, and any other appropriate metadata information. Metadata 716 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk (also referred to as a data segment), one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 701 includes file service interface 702, segmenter 704 (also referred to as a chunking module or unit), duplicate eliminator 706, file system control 708, and storage unit interface 712. Deduplication storage engine 701 receives a file or files (or data item(s)) via file service interface 702, which may be part of a file system namespace 720 of a file system associated with the deduplication storage engine 701. The file system namespace 720 refers to the way files are identified and organized in the system. An example is to organize the files hierarchically into directories or folders, which may be managed by directory manager 722. File service interface 712 supports a variety of protocols, including a network file system (NFS), a common Internet file system (CIFS), and a virtual tape library interface (VTL), etc.

The file(s) is/are processed by segmenter 704 and file system control 708. Segmenter 704, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based, such as, for example, a hash function is applied to values of data within a sliding window through the data stream or block and when the hash function is equal to a value (or equal to one of several values) then a chunk boundary is identified. In various embodiments, chunk boundaries are identified using content based functions operating on a sliding window within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, a chunk boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 708, also referred to as a file system manager, processes information to indicate the chunk(s) association with a file. In some embodiments, a list of fingerprints is used to indicate chunk(s) associated with a file. File system control 708 passes chunk association information (e.g., representative data such as a fingerprint) to index 724. Index 724 is used to locate stored chunks in storage units 710 via storage unit interface 712. Duplicate eliminator 706, also referred to as a segment store, identifies whether a newly received chunk has already been stored in storage units 710. In the event that a chunk has already been stored in storage unit(s), a reference to the previously stored chunk is stored, for example, in a chunk or segment tree associated with the file, instead of storing the newly received chunk. A chunk or segment tree of a file may include one or more nodes and each node represents or references one of the deduplicated chunks stored in storage units 710 that make up the file. Chunks are then packed by a container manager (which may be implemented as part of storage unit interface 712) into one or more storage containers stored in storage units 710. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 702 is configured to communicate with file system control 708 to identify appropriate chunks stored in storage units 710 via storage unit interface 712. Storage unit interface 712 may be implemented as part of a container manager. File system control 708 communicates (e.g., via segmenter 704) with index 724 to locate appropriate chunks stored in storage units via storage unit interface 712. Appropriate chunks are retrieved from the associated containers via the container manager and are used to construct the requested file. The file is provided via interface 702 in response to the request. In one embodiment, file system control 708 utilizes a tree (e.g., a chunk tree obtained from namespace 720) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 701 may be implemented in software (e.g., executable code executed in a memory by a processor), hardware (e.g., processor(s)), or a combination thereof. For example, deduplication engine 701 may be implemented in a form of executable instructions that can be stored in a machine-readable storage medium, where the instructions can be executed in a memory by a processor.

In one embodiment, storage system 700 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

FIG. 8 is a block diagram illustrating an example of a data processing system which may be used with one embodiment of the invention. For example, system 800 may represents any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra low voltage processor, may act as a main processing unit and central hub for communication with the various components of the system. Such processor can be implemented as a system on chip (SoC). Processor 801 is configured to execute instructions for performing the operations and steps discussed herein. System 800 further includes a graphics interface that communicates with graphics subsystem 804, which may include a display controller, a graphics processor, and/or a display device.

Processor 801 may communicate with memory 803, which in an embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 800 may further include IO devices such as devices 805-808, including network interface device(s) 805, input device(s) 806, and other IO device(s) 807. Network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software (e.g., module, unit, and/or logic 828) embodying any one or more of the methodologies or functions described herein. Module/unit/logic 828 may also reside, completely or at least partially, within memory 803 and/or within processor 801 during execution thereof by data processing system 800, memory 803 and processor 801 also constituting machine-accessible storage media. Module/unit/logic 828 may further be transmitted or received over a network via network interface device 805. In some embodiments, module/unit/logic 828 includes a throttling module 850 such as those throttling modules described above. In some embodiments, module/unit/logic 828 includes a job scheduler 852 such as those job schedulers described above.

Computer-readable storage medium 809 may also be used to store the some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 828, components and other features described herein can be implemented as discrete hardware components or integrated in the functionality of hardware components such as ASICS, FPGAs, DSPs or similar devices. In addition, module/unit/logic 828 can be implemented as firmware or functional circuitry within hardware devices. Further, module/unit/logic 828 can be implemented in any combination hardware devices and software components.

Note that while system 800 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for managing resources of virtual backup appliances, the method comprising:

receiving, by a backup management server (BMS), a request to back up a plurality of virtual machines (VMs) of a set of one or more VM servers, wherein each VM includes one or more VM disk files that are stored on a set of one or more VM storage arrays, wherein the BMS is configured to manage backup operations to back up data from the set of VM storage arrays to a backup storage system over a network, wherein a primary VM server of the set of VM servers has a virtual backup appliance (VBA), wherein any remaining VM servers of the set of VM servers each have a VBA proxy, and wherein the VBA receives backup jobs from the BMS and communicates with any VBA proxies to carry out the backup jobs;

determining, at the BMS, a set of VMs to be backed up from the plurality of VMs in the backup request that yields a maximum performance for the backup request without causing the set of VM servers to become bottlenecked, wherein the determination is performed based on at least one of a concurrency limit of the VBA and any VBA proxies corresponding to the set of VMs, and a set of one or more data performance metrics of one or more storage devices in the set of VM storage arrays, wherein the set of data throughput performance metrics includes a set of one or more latency measurements for the one or more storage devices in the set of VM storage arrays as measured by the BMS while the VBA and any VBA proxies carry out the one or more backup jobs, wherein for each of the one or more storage devices, the BMS sends an increasing number of the one or more backup jobs to the VBA for VMs that have VM disk files on that storage device until the latency measurement for that storage device exceeds a predetermined threshold, and wherein the set of VMs to be backed up are those VMs that are associated with the one or more backup jobs; and sending one or more backup jobs to the VBA to back up the determined set of VMs to be backed up to the backup storage system.

2. The method of claim 1, wherein the concurrency limit of the VBA and any VBA proxies is a maximum number of VMs that each VBA and VBA proxy can process at once, and wherein the BMS further requests concurrency limits from the VBA and any VBA proxies prior to the sending of the one or more backup jobs.

3. The method of claim 1, wherein the set of VMs to be backed up is determined from the plurality of VMs in the backup request such that a net aggregate maximum read performance throughput is reached for the set of VM storage arrays when the VBA and any VBA proxies carry out the backup jobs of the set of VMs to be backed up.

4. The method of claim 3, wherein the net aggregate maximum read performance throughput is reached when the set of VMs to be backed up is selected to have VM disk files that when backed up by the VBA and any VBA proxies, generate the maximum read throughput limit in the most number of the one or more storage devices in the set of VM storage arrays.

5. The method of claim 1, wherein the BMS adjusts an input/output (I/O) rate of all the backup jobs for VMs with VM disk files on a saturated storage device such that each backup job requests a similar amount of data transfer from that saturated storage device, wherein a saturated storage device is a storage device with a latency measurement that exceeds the predetermined threshold.

6. The method of claim 1, wherein the BMS includes a backup policy store to store at least one of the concurrency limit of the VBA and any VBA proxies corresponding to the set of VMs, and the set of one or more data performance metrics.

7. A non-transitory machine readable storage medium comprising instructions for managing resources of virtual backup appliances, which when executed by a computing system causes the computing system to perform operations comprising:

receiving, by a backup management server (BMS), a request to back up a plurality of virtual machines (VMs) of a set of one or more VM servers, wherein each VM includes one or more VM disk files that are stored on a set of one or more VM storage arrays, wherein the BMS is configured to manage backup operations to back up data from the set of VM storage arrays to a backup storage system over a network, wherein a primary VM server of the set of VM servers has a virtual backup appliance (VBA), wherein any remaining VM servers of the set of VM servers each have a VBA proxy, and wherein the VBA receives backup jobs from the BMS and communicates with any VBA proxies to carry out the backup jobs;

determining, at the BMS, a set of VMs to be backed up from the plurality of VMs in the backup request that yields a maximum performance for the backup request without causing the set of VM servers to become bottlenecked, wherein the determination is performed based on at least one of a concurrency limit of the VBA and any VBA proxies corresponding to the set of VMs, and a set of one or more data performance metrics of one or more storage devices in the set of VM storage arrays, wherein the set of data throughput performance metrics includes a set of one or more latency measurements for the one or more storage devices in the set of VM storage arrays as measured by the BMS while the VBA and any VBA proxies carry out the one or more backup jobs, wherein for each of the one or more storage devices, the BMS sends an increasing number of the one or more backup jobs to the VBA for VMs that have VM disk files on that storage device until the latency measurement for that storage device exceeds a predetermined threshold, and wherein the set of VMs to be backed up are those VMs that are associated with the one or more backup jobs; and sending one or more backup jobs to the VBA to back up the determined set of VMs to be backed up to the backup storage system.

8. The non-transitory computer readable storage medium of claim 7, wherein the concurrency limit of the VBA and any VBA proxies is a maximum number of VMs that each VBA and VBA proxy can process at once, and wherein the BMS further requests concurrency limits from the VBA and any VBA proxies prior to the sending of the one or more backup jobs.

9. The non-transitory computer readable storage medium of claim 7, wherein the set of VMs to be backed up is determined from the plurality of VMs in the backup request such that a net aggregate maximum read performance throughput is reached for the set of VM storage arrays when the VBA and any VBA proxies carry out the backup jobs of the set of VMs to be backed up.

10. The non-transitory computer readable storage medium of claim 9, wherein the net aggregate maximum read performance throughput is reached when the set of VMs to be backed up is selected to have VM disk files that when backed up by the VBA and any VBA proxies, generate the maximum read throughput limit in the most number of the one or more storage devices in the set of VM storage arrays.

11. The non-transitory computer readable storage medium of claim 7, wherein the BMS adjusts an input/output (I/O) rate of all the backup jobs for VMs with VM disk files on a saturated storage device such that each backup job requests a similar amount of data transfer from that saturated storage device, wherein a saturated storage device is a storage device with a latency measurement that exceeds the predetermined threshold.

12. The non-transitory computer readable medium of claim 7, wherein the BMS includes a backup policy store to store at least one of the concurrency limit of the VBA and any VBA proxies corresponding to the set of VMs, and the set of one or more data performance metrics.

13. A data processing system comprising:

a backup management server; and a memory coupled to the processing system storing instructions, which when executed from the memory, cause the backup management server to:

receive, by a backup management server (BMS), a request to back up a plurality of virtual machines (VMs) of a set of one or more VM servers, wherein each VM includes one or more VM disk files that are stored on a set of one or more VM storage arrays, wherein the BMS is configured to manage backup operations to back up data from the set of VM storage arrays to a backup storage system over a network, wherein a primary VM server of the set of VM servers has a virtual backup appliance (VBA), wherein any remaining VM servers of the set of VM servers each have a VBA proxy, and wherein the VBA receives backup jobs from the BMS and communicates with any VBA proxies to carry out the backup jobs;

determine, at the BMS, a set of VMs to be backed up from the plurality of VMs in the backup request that yields a maximum performance for the backup request without causing the set of VM servers to become bottlenecked, wherein the determination is performed based on at least one of a concurrency limit of the VBA and any VBA proxies corresponding to the set of VMs, and a set of one or more data performance metrics of one or more storage devices in the set of VM storage arrays, wherein the set of data throughput performance metrics includes a set of one or more latency measurements for the one or more storage devices in the set of VM storage arrays as measured by the BMS while the VBA and any VBA proxies carry out the one or more backup jobs, wherein for each of the one or more storage devices, the BMS sends an increasing number of the one or more backup jobs to the VBA for VMs that have VM disk files on that storage device until the latency measurement for that storage device exceeds a predetermined threshold, and wherein the set of VMs to be backed up are those VMs that are associated with the one or more backup jobs; and send one or more backup jobs to the VBA to back up the determined set of VMs to be backed up to the backup storage system.

14. The system of claim 13, wherein the concurrency limit of the VBA and any VBA proxies is a maximum number of VMs that each VBA and VBA proxy can process at once, and wherein the BMS further requests concurrency limits from the VBA and any VBA proxies prior to the sending of the one or more backup jobs.

15. The system of claim 13, wherein the set of VMs to be backed up is determined from the plurality of VMs in the backup request such that a net aggregate maximum read performance throughput is reached for the set of VM storage arrays when the VBA and any VBA proxies carry out the backup jobs of the set of VMs to be backed up.

16. The system of claim 15, wherein the net aggregate maximum read performance throughput is reached when the set of VMs to be backed up is selected to have VM disk files that when backed up by the VBA and any VBA proxies, generate the maximum read throughput limit in the most number of the one or more storage devices in the set of VM storage arrays.

17. The system of claim 13, wherein the BMS adjusts an input/output (I/O) rate of all the backup jobs for VMs with VM disk files on a saturated storage device such that each backup job requests a similar amount of data transfer from that saturated storage device, wherein a saturated storage device is a storage device with a latency measurement that exceeds the predetermined threshold.

* * * * *